(12) United States Patent
Monk

(10) Patent No.: US 7,809,637 B2
(45) Date of Patent: Oct. 5, 2010

(54) PORTABILITY OF FINANCIAL TOKENS

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 11/757,837

(22) Filed: Jun. 4, 2007

(65) Prior Publication Data

US 2008/0301048 A1    Dec. 4, 2008

(51) Int. Cl.
G06Q 40/00 (2006.01)

(52) U.S. Cl. .......................................... 705/39; 705/35

(58) Field of Classification Search ................... None
See application file for complete search history.

(56) References Cited

U.S. PATENT DOCUMENTS

| | | | |
|---|---|---|---|
| 5,465,206 A | 11/1995 | Hilt et al. | |
| 5,477,038 A | 12/1995 | Levine et al. | |
| 5,500,513 A | 3/1996 | Langhans et al. | |
| 5,621,201 A | 4/1997 | Langhans et al. | |
| 5,815,665 A | 9/1998 | Teper et al. | |
| 5,845,070 A | 12/1998 | Ikudome | |
| 6,032,136 A * | 2/2000 | Brake et al. ................... | 705/41 |
| 6,247,129 B1 | 6/2001 | Keathley et al. | |
| 6,270,011 B1 | 8/2001 | Gottfried | |
| 6,282,522 B1 | 8/2001 | Davis et al. | |
| 6,560,581 B1 | 5/2003 | Fox et al. | |
| 6,631,849 B2 | 10/2003 | Blossom | |
| 6,837,425 B2 | 1/2005 | Gauthier et al. | |
| 6,915,279 B2 | 7/2005 | Hogan et al. | |
| 6,920,611 B1 | 7/2005 | Spaeth et al. | |
| 6,957,334 B1 | 10/2005 | Goldstein et al. | |
| 7,007,840 B2 | 3/2006 | Davis | |
| 7,039,611 B2 | 5/2006 | Devine | |
| 7,051,923 B2 | 5/2006 | Nguyen et al. | |
| 7,104,446 B2 | 9/2006 | Bortolin et al. | |
| 7,111,789 B2 | 9/2006 | Rajasekaran et al. | |
| 7,121,456 B2 | 10/2006 | Speath et al. | |
| 7,124,937 B2 | 10/2006 | Myers et al. | |
| 7,136,841 B2 | 11/2006 | Cook | |
| 7,152,780 B2 | 12/2006 | Gauthier et al. | |
| 7,163,153 B2 | 1/2007 | Blossom | |
| 7,191,952 B2 | 3/2007 | Blossom | |
| 7,243,853 B1 | 7/2007 | Levy et al. | |
| 7,280,981 B2 | 10/2007 | Huang et al. | |

(Continued)

OTHER PUBLICATIONS

U.S. Appl. No. 11/757,623, Monk.

(Continued)

*Primary Examiner*—Hani Kazimi
*Assistant Examiner*—John D Scarito
(74) *Attorney, Agent, or Firm*—Townsend and Townsend and Crew LLP

(57) ABSTRACT

A method determines that a first relationship between a holder of a portable consumer device and a first employer is terminated. In response to determining that the first relationship is terminated, the method also disassociates account information of the portable consumer device from the first employer while retaining an association between the portable consumer device and an issuer of the portable consumer device. In addition, the method establishes a second relationship between the employee and a second employer and links the account information of the portable consumer device with the second employer.

25 Claims, 2 Drawing Sheets

U.S. PATENT DOCUMENTS

| | | | |
|---|---|---|---|
| 7,398,238 B1* | 7/2008 | Calce et al. | 705/35 |
| 2002/0111919 A1 | 8/2002 | Weller et al. | |
| 2002/0194138 A1 | 12/2002 | Dominguez et al. | |
| 2002/0198831 A1* | 12/2002 | Patricelli et al. | 705/40 |
| 2003/0074311 A1* | 4/2003 | Saylors et al. | 705/39 |
| 2003/0120593 A1 | 6/2003 | Bansal et al. | |
| 2003/0149660 A1* | 8/2003 | Canfield | 705/39 |
| 2003/0172040 A1 | 9/2003 | Kemper et al. | |
| 2003/0200184 A1 | 10/2003 | Dominguez et al. | |
| 2003/0212642 A1 | 11/2003 | Weller et al. | |
| 2003/0233292 A1 | 12/2003 | Richey et al. | |
| 2004/0019522 A1 | 1/2004 | Bortolin et al. | |
| 2004/0044621 A1 | 3/2004 | Huang et al. | |
| 2004/0049436 A1* | 3/2004 | Brand et al. | 705/30 |
| 2004/0050922 A1 | 3/2004 | Gauthier et al. | |
| 2004/0054581 A1 | 3/2004 | Redford et al. | |
| 2004/0054590 A1 | 3/2004 | Redford et al. | |
| 2004/0054591 A1 | 3/2004 | Spaeth et al. | |
| 2004/0059688 A1 | 3/2004 | Dominguez et al. | |
| 2004/0111361 A1* | 6/2004 | Griffiths et al. | 705/39 |
| 2004/0139021 A1 | 7/2004 | Reed et al. | |
| 2004/0143464 A1* | 7/2004 | Houle et al. | 705/4 |
| 2004/0148224 A1 | 7/2004 | Gauthier et al. | |
| 2004/0153715 A1 | 8/2004 | Spaeth et al. | |
| 2004/0220964 A1 | 11/2004 | Shiftan et al. | |
| 2004/0225545 A1* | 11/2004 | Turner et al. | 705/8 |
| 2005/0021456 A1 | 1/2005 | Steele et al. | |
| 2005/0029344 A1 | 2/2005 | Davis | |
| 2005/0036611 A1 | 2/2005 | Seaton, Jr. et al. | |
| 2005/0045718 A1 | 3/2005 | Bortolin et al. | |
| 2005/0049950 A1* | 3/2005 | Johnson | 705/35 |
| 2005/0058427 A1 | 3/2005 | Nguyen et al. | |
| 2005/0071225 A1 | 3/2005 | Bortolin et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0102234 A1 | 5/2005 | Devine | |
| 2005/0121506 A1 | 6/2005 | Gauthier et al. | |
| 2005/0149455 A1 | 7/2005 | Bruesewitz et al. | |
| 2005/0246278 A1 | 11/2005 | Gerber et al. | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0006224 A1 | 1/2006 | Modi | |
| 2006/0080243 A1 | 4/2006 | Kemper et al. | |
| 2006/0155644 A1 | 7/2006 | Reid et al. | |
| 2006/0163345 A1 | 7/2006 | Myers et al. | |
| 2006/0173739 A1* | 8/2006 | Heywood | 705/14 |
| 2006/0178957 A1 | 8/2006 | LeClaire | |
| 2006/0179007 A1 | 8/2006 | Davis | |
| 2006/0212313 A1* | 9/2006 | Hoffman et al. | 705/2 |
| 2006/0289621 A1* | 12/2006 | Foss et al. | 235/375 |
| 2006/0290501 A1 | 12/2006 | Hammad et al. | |
| 2006/0293027 A1 | 12/2006 | Hammad et al. | |
| 2007/0001000 A1 | 1/2007 | Nguyen et al. | |
| 2007/0001001 A1 | 1/2007 | Myers et al. | |
| 2007/0005613 A1 | 1/2007 | Singh et al. | |
| 2007/0005774 A1 | 1/2007 | Singh et al. | |
| 2007/0012764 A1 | 1/2007 | Bortolin et al. | |
| 2007/0017970 A1 | 1/2007 | Gauthier et al. | |
| 2007/0034679 A1 | 2/2007 | Gauthier et al. | |
| 2007/0055597 A1 | 3/2007 | Patel et al. | |
| 2007/0055630 A1 | 3/2007 | Gauthier et al. | |
| 2007/0057034 A1 | 3/2007 | Gauthier et al. | |
| 2007/0057051 A1 | 3/2007 | Bortolin et al. | |
| 2007/0083465 A1 | 4/2007 | Ciurea et al. | |
| 2007/0100691 A1 | 5/2007 | Patterson | |
| 2007/0125842 A1 | 6/2007 | Antoo et al. | |
| 2007/0262134 A1* | 11/2007 | Humphrey et al. | 235/379 |

OTHER PUBLICATIONS

U.S. Appl. No. 11/757,980, Monk.
U.S. Appl. No. 11/757,983, Monk.
U.S. Appl. No. 11/757,914, Monk.
U.S. Appl. No. 11/757,893, Monk.
U.S. Appl. No. 11/757,985, Monk.
International Preliminary Report on Patentability from International Application No. PCT/US2008/065662 dated Dec. 17, 2009, 12 pages.

* cited by examiner

PORTABILITY OF FINANCIAL TOKENS

BACKGROUND

There are millions of employees and independent contractors who do not have checking accounts. Instead of receiving a payroll check, an employee or independent contractor can receive a payroll card. The payroll card can be provided by an employer. The employer can make funds available on the payroll card automatically using card account information. The employee or independent contractor can then use the payroll card at a bank or an ATM to withdraw funds.

When an employee leaves an employer, the employer may retain the payroll card or close the account on the payroll card. The employee looses the use of the payroll card for receiving payments from a new employer. A new payroll card must be issued in some cases.

Independent contractors have multiple or zero employers at any given time. When an employer terminates an independent contractor, the employer may retain the payroll card or close the account on the payroll card. For this reason, the independent contractor must have a separate payroll card for each employer. Similarly, an employee with multiple employers may also need a separate payroll card for each employer.

Embodiments of the present invention address these and other problems, individually and collectively.

BRIEF SUMMARY

Embodiments of the invention are directed to methods, computer readable media, and systems that allow an employee to use their portable consumer device such a payroll card after leaving their current employer.

One embodiment of the invention is directed to a method that determines that a first relationship between a holder of a portable consumer device and a first employer is terminated. In response to determining that the first relationship is terminated, the method further disassociates the account information of the portable consumer device from the first employer while retaining an association between the portable consumer device and an issuer of the portable consumer device. The method also establishes a second relationship between the holder and a second employer and links the account information of the portable consumer device with the second employer.

Another embodiment of the invention is directed to a method that determines that a first relationship between a holder of a portable consumer device and a first employer is terminated. In response to determining that the first relationship is terminated, the method further disassociates account information of the portable consumer device from the first employer while retaining an association between the portable consumer device and an issuer of the portable consumer device. The method also strips one or more benefits associated with the first employer from the portable consumer device. The method further determines a status of the portable consumer device. If the status of the portable consumer device is one of a plurality of pre-determined statuses, the method also places the portable consumer device in an orphan standing.

These and other embodiments of the invention are described in further detail below.

DETAILED DESCRIPTION

Embodiments of the invention may solve above-noted problems by allowing an employee to retain the use of their portable consumer device after leaving their current employer. In addition, the employee can use the same portable consumer device to receive payments from a new employer. When the relationship between an employee and their current employer ends, benefits provided by the current employer are stripped. The account for the portable consumer device is placed in orphan standing and is assigned a standard fee schedule. When the employee establishes a relationship with a new employer, benefits with a new fee schedule are provided by the new employer. In addition, a direct deposit number and a routing number for depositing funds available on the portable consumer device are given to the new employer. Thus, the employee can use the same portable consumer device to receive payments and benefits from their new employer. Similarly, embodiments of the invention allow an independent contractor to use the same portable consumer device with any number of employers.

Certain embodiments of the invention may provide one or more technical advantages to a number of entities. Such entities may include issuers, merchants, employers, and employees.

The technical advantage to an employer is that portable consumer devices such as payroll cards are less expensive to issue than paper checks. Also, the management (including reconciliation) of the employer's payroll using portable consumer devices is easier than using checks, since all payments are in electronic form.

One technical advantage to an employee is that portable consumer devices are more convenient to use than paper checks. Another technical advantage to the employee is that the portable consumer devices can be used after leaving a current employer. In addition, the employee can use the same portable consumer device with a new employer. Similarly, if the employee has multiple employers, the employee can use the same portable consumer device to receive payments from multiple employers.

One technical advantage to an issuer is that certain embodiments may reduce the cost of customer acquisition for the issuer. For example, the same portable consumer device will be used with several employers. Therefore, an issuer can retain the accounts of the employees and does not lose them as customers. Another technical advantage to the issuer is that certain embodiments may increase the use of portable consumer devices. For example, by allowing portability of these devices, employees will use the devices to pay for more goods and services.

Certain embodiments of the invention may include none, some, or all of the above technical advantages. One or more other technical advantages may be readily apparent to one skilled in the art from the figures, descriptions, and claims included herein.

Figure 1:
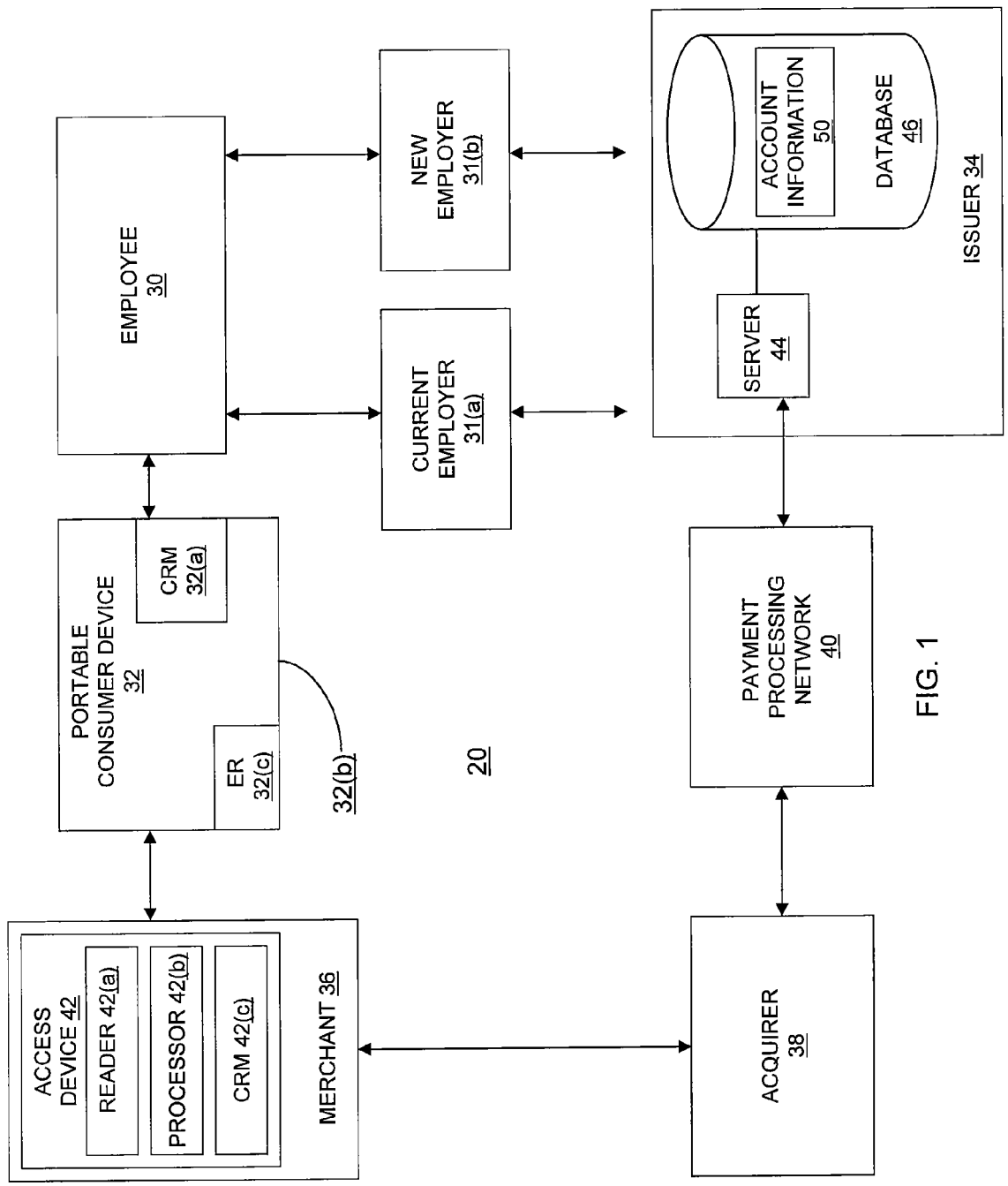
FIG. 1 shows a block diagram of a system according to an embodiment of the invention.

FIG. 1 illustrates a system 20 according to an embodiment of the invention. System 20 includes an employee 30, a current employer 31(a), a new employer 31(b), a portable consumer device 32, an issuer 34, a merchant 36, an acquirer 38, and a payment processing network 40.

System 20 includes an employee 30 in operative communication with either current employer 31(a) or new employer 31(b). Employee 30 is also in operative communication with a portable consumer device 32. Current employer 31(a) may have given employee 30 portable consumer device 32 in exchange for work performed, or may provide portable consumer device 32 with additional value if portable consumer device 32 is in the form of a reloadable card, cell phone, key fob, etc. Issuer 34 is in operative communication with current employer 31(a) and/or new employer 31(b). Issuer 34 may have an account with employee 30 associated with portable consumer device 32. Portable consumer device 32 is in operative communication with merchant 36 to make purchases or withdraw cash. Merchant 36 is in operative communication with acquirer 38. In some cases, merchant 36 may have an account with acquirer 38 and therefore, may be affiliated with acquirer 38. Acquirer 38 is also in operative communication with issuer 34 through payment processing network 40.

Employee 30 may refer to any suitable entity or entities that use portable consumer device 32 to receive payments from employers 31(a) and 31(b). An employee 30 may be a traditional employee, an independent contractor, or another entity that might receive payments from employers 31(a) and 31(b). In some cases, employee 30 may include multiple entities. For example, employee 30 may be an organization that receives payments from employers for performance by members of the organization.

Employer, such as current employer 31(a) and new employer 31(b), may refer to entities that make payments to employee 30 using portable consumer device 32. For example, payments could be made from a business to its employees, a governmental entity such as a state or local government to a benefit recipient (e.g., a social security benefit recipient for social security payments, a disability benefit recipient for disability payments), insurers to their insured individuals (e.g., reimbursement payments to insured individuals for insurance claims), etc.

The relationship between an employer and employee 30 refers to any arrangement that results in payments received using portable consumer device 32. In some cases, the relationship may include an agreement.

Portable consumer device 32 may be in any suitable form. For example, suitable portable consumer devices 32 can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 32 include cellular phones, personal digital assistants (PDAs), pagers, payment cards, security cards, access cards, smart media, transponders, and the like.

Portable consumer device 32 may comprise a computer readable medium 32(a) and a body 32(b). Computer readable medium 32(a) may be on body 32(b). Body 32(b) may in the form a plastic substrate, housing, or other structure. Computer readable medium 32(a) may be a memory that stores data and may be in any suitable form. Exemplary computer readable media 32(a) may be in any suitable form including a magnetic stripe, a memory chip, etc. If portable consumer device 32 is in the form of a card, it may have an embossed region ER 32(c) which is embossed with a PAN (primary account number). Computer readable medium 32(a) may electronically store the PAN as well as other data such as PIN data.

Payment processing network 40 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base 11 system which performs clearing and settlement services. Payment processing network 40 may use any suitable wired or wireless network, including the Internet.

Merchant 36 may also have, or may receive communications from, an access device 42 that can interact with portable consumer device 32. In the illustrated embodiment, access device 42 is located at merchant 36. However, access device 42 may be located at any other suitable location in other embodiments of the invention. Merchant 36 may be a department store, a gas station, a drug store, a grocery store, or other suitable business.

Access device 42 may be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 42 may use any suitable contact or contactless mode of operation to send or receive data from portable consumer devices 32.

If access device 42 is a point of sale terminal, any suitable point of sale terminal may include a reader 42(a), a processor 42(b) and a computer readable medium 42(c). Reader 42(b) may include any suitable contact or contactless mode of operation. For example, exemplary card readers can include RF (radio frequency) antennas, optical scanners, bar code reader, magnetic stripe readers, etc. to interact with portable consumer device 32.

Acquirer 38 is typically a bank that has an account with merchant 36. Employer 30 may have an account with issuer 34 and merchant 36 may have an account with acquirer 38.

Issuer 34 may refer to any suitable entity that issues portable consumer device 32 to employee 30. For example, issuer 34 may be a bank. In another example, issuer 34 may be a business entity such a retail store. In some embodiments, issuer 34 may be current employer 31(a). Some entities are both acquirers 38 and issuers 34, and embodiments of the invention include such entities.

Issuer 34 may have or operate a server computer 44 and a database 46. In the illustrated embodiment, issuer 34 comprises server computer 44 communicatively coupled to database 46. Server computer 44 may include any hardware, software, other logic, or combination of the preceding for servicing the requests from one or more client computers. Server computer 44 may use any of a variety of computing structures, arrangements, and compilations for servicing the requests from one or more client computers. In one embodiment, server computer 44 may be a powerful computer or cluster of computers. For example, server computer 44 can be a large mainframe, a minicomputer cluster, or a group of servers functioning as a unit. In one example, server computer 44 may be a database server coupled to a Web server. Server computer 44 services the requests of one or more client computers.

Database 32 may include any hardware, software, firmware, or combination of the preceding for storing and facilitating retrieval of information. Also, database 46 may use any of a variety of data structures, arrangements, and compilations to store and facilitate retrieval of information. In the illustrated embodiment, database 32 is located on issuer 34. Database 46 may be located on other components of system 20 in other embodiments. For example, database 46 may be located on portable consumer device 32.

Monetary values associated with portable consumer device 32 may be stored on database 46 on issuer 34, on portable consumer device 32, or on another component of system 20. In some embodiments, portable consumer device 32 may have an identification number. The identification number may be stored in database 46 with the monetary value (e.g., $500) associated with portable consumer device 32. In this example, data representing the monetary value (e.g., $500) would not be stored on portable consumer device 32. In other embodiments, data representing the monetary value associated with portable consumer device 32 could be stored in computer readable medium 32(a) of portable consumer device 32.

Account information refers to information related to holder's account with issuer 34 associated with portable consumer device 32. Account information may be stored in database 46 on issuer 34, on portable consumer device 32, or on another component of system 20. Account information 50 includes any suitable information associated with making transactions using portable consumer device 32. In some embodiments, server computer 44 may manipulate account information 50 stored in database 46. In other embodiments, other components of system 20 may manipulate account information 50 stored on database 46.

Examples of account information include employer account information, portable consumer device 32 identification data, pin data, direct deposit number and routing number, benefits information, and device status. In one embodiment, account information may include an account number such as a direct deposit number and a routing number. For example, current employer 31(a) and new employer 31(b) may use a direct deposit number and a routing number to automatically deposit funds to the account on portable consumer device 32. Account numbers are associated with a bank account in some cases.

Benefits information describes benefits provided by an employer to employee 30 when using portable consumer device 32. In one embodiment, benefits information includes a fee schedule which lists fees charged to employee 30 when using portable consumer device 32 to conduct transactions. Fees may be, for example, some percentage of the value of the transactions conducted. In one case, the percentage may be less than about 5, 2, or 1 percent. Issuer 34 may collect the fees charged to employee 30 and pay all or a portion of the collected fees to the acquirer and/or merchant 36 for participating in the transactions. Transactions may include cash withdrawals which may be free to employee 30 in another example of a fee.

Device status refers to a state or a condition of portable consumer device 32 at a particular time. Examples of statuses include "active," "pending issuance," "issued," "suspended," "administratively suspended," "lost," "stolen," "expired," "pending account closure," "closed," "closed for fraud," "returned," "voided," "fraud lock," "hold," "research required," "stale," and "damaged." Current employer 31(a), new employer 31(b), employee 30, issuer 34, or combination thereof, may define the status of portable consumer device 32. In one case, a portable consumer device 32 that has been activated has the device status of "active." In another case, portable consumer device 32 that has been closed for fraudulent transactions has the device status of "closed for fraud." Portable consumer device 32 may be associated with any suitable number of device statuses.

In the illustrated embodiment, current employer 31(a) gives employee 30 portable consumer device 32 in exchange for performance. Employee 30 leaves current employer 31(a) and keeps portable consumer device 32. Benefits provided by current employer 31(a) are denied to or stripped from employee 30 by removing or modifying benefits information in account information 50. Employee 30 is transferred to a standard fee table. Employee 30 may be notified that the benefits have been stripped in one case. Employer may also loose access to account information 50 in another case. After employment begins with new employer 31(b), benefits are provided by new employer 31(b) by adding benefits information to account information 50. Also, an account number such as a direct deposit number and a routing number from account information 50 are automatically transferred to new employer 31(b). Thus, employee 30 retains the use of portable consumer device 32 and can receive payments from their new employer 31(b).

The account associated with portable consumer device 32 may be placed in orphan standing after employee 30 terminates the relationship with current employer 31(a). An account in orphan standing refers to an account of portable consumer device 32 with an employee that is not linked with either current employer 31(a) or new employer 31(b). Thus, no employer has a financial obligation to employee 30 in orphan standing. While in orphan standing, the account on portable consumer device 32 may be given a standard set of benefits according to a standard fee schedule. Employee 30 may pay for any charges associated with the standard fee schedule in one example. In another example, current employer 31(a) may pay for the charges for a certain period of time or until employee 30 becomes employed by new employer 31(b). The standard set of benefits may be defined by any entity such as issuer 34, employee 30, or other suitable entity. In some embodiments, the standard set of benefits may be pre-defined when portable consumer device 32 was issued. In other embodiments, the standard set of benefits may be defined when employee 30 leaves current employer 31(a). Employee 30 may have the opportunity to modify the standard set of benefits in some cases.

In one embodiment, a portable consumer device 32 must qualify for placement in orphan standing and for transfer to new employer 31(b). In one embodiment, portable consumer device 32 must have one or more device statuses to qualify for placement in orphan standing and for transfer to new employer 31(b). Current employer 31(a), new employer 31(b), employee 30, issuer 34, or any combination thereof, may designate the one or more qualifying statuses. For example, current employer 31(a) may want only those portable consumer devices 32 that have been activated to be transferred to new employer 31(b). Current employer 31(a) may designate that a portable consumer device 32 must have "active" status to be transferred to orphan standing. In another example, current employer 31(a) may want only portable consumer devices 32 with a plurality of designated statuses to be transferred to orphan standing. In this case, the portable consumer device 32 can only be transferred to orphan standing when all the designated statuses are established.

In another embodiment, portable consumer device 32 that has a disqualifying status cannot be placed in orphan standing or transferred to new employer 31(b). Current employer 31(a), employee 30, issuer 34, or any combination thereof, may designate the one or more disqualifying statuses. For example, current employer 31(a) may want to stop the transfer of portable consumer device 32 that has been closed because it was used in fraudulent transactions. Current employer 31(a) may designate that portable consumer device 32 with a device status of "closed for fraud" cannot be transferred to new employer 31(b).

Modifications, additions, or omissions may be made to system 20 without departing from the scope of the invention. The components of system 20 may be integrated or separated according to particular needs. Moreover, the operations of system 20 may be performed by more, fewer, or other system modules. Additionally, operations of system 20 may be performed using any suitable logic comprising software, hardware, other logic, or any suitable combination of the preceding.

Figure 2:
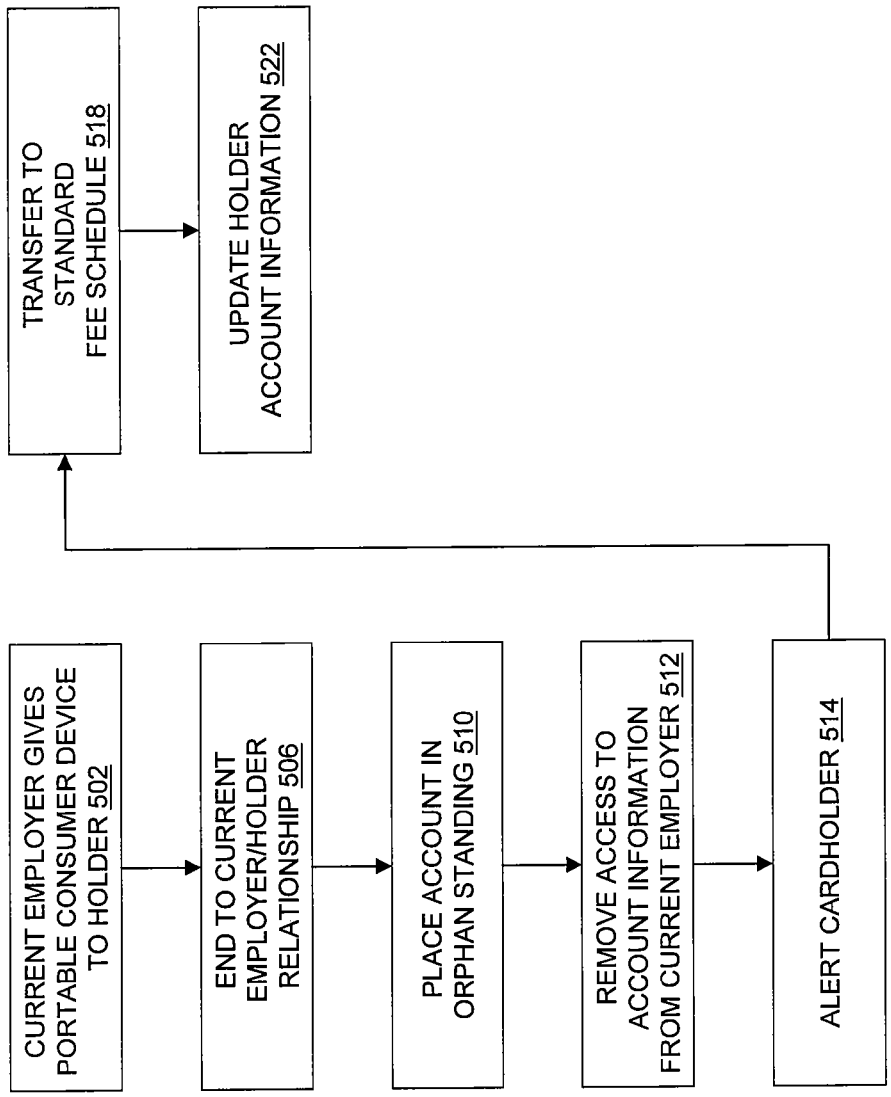
FIG. 2 shows a flowchart illustrating a method according to an embodiment of the invention.

As shown in FIG. 2, current employer 31(*a*) provides holder with portable consumer device 32 (step 502). Portable consumer device 32 may have been created by issuer 34 or provisioned by issuer 34. For example, issuer 34 may issue portable consumer devices to the holders on behalf of current employer 31(*a*). They could be provided directly to holder from issuer 34, from current employer 31(*a*), or from a third party operating on behalf of current employer 31(*a*). A separate wage statement may also be sent from current employer 31(*a*) to holder. It may include information such as tax information, benefits and/or salary accrued to date, etc.

As used herein, "holder" refers to any suitable entity that uses portable consumer device to make transactions. Holder may be an employee 30 of current employer 31(*a*). In another embodiment, holder may be an agent of employee 30 using portable consumer device 32 for the benefit of employee 30. In yet another of embodiments, holder may be an entity that has obtained the use of portable consumer device by any suitable means.

Portability refers to the concept of retaining the association between issuer 34 and the holder after the relationship initiating the issuance of portable consumer device 32 ends. Initially, for example, current employer 31(*a*) may provide a holder with portable consumer device 32 in exchange for services. The holder may then be terminated by current employer 31(*a*). Even though the initiating relationship between the holder and current employer 31(*a*) is extinguished, holder's account with issuer 34 associated with portable consumer device 32 may remain open. Thus, the holder continues to have use of their portable consumer device 32 after the initiating relationship ends.

A portability trigger refers to any suitable event that initiates the transfer of the account of holder from current employer 31(*a*) to orphan standing or to next employer 31(*b*). In one embodiment, the end of the relationship between current employer and holder may be a portability trigger. In another embodiment, the closing of the bank account of current employer 31(*a*) may be a portability trigger. In yet another embodiment, the use of portable consumer device 32 in fraudulent transactions may be a portability trigger. Issuer 34 may be notified of the occurrence of the portability trigger from current employer 31(*a*), from the holder, or from any other suitable entity.

Current employer 31(*a*) terminates the relationship with holder of portable consumer device 32 (step 506). Current employer 31(*a*) notifies issuer 34 that the relationship between current employer 31(*a*) and holder has ended. The end of the relationship triggers portability. In response, server computer 44 on issuer 34 unlinks the holder from current employer 31(*a*) in holder's account information 50 stored in database 46. Holder's account with issuer 34 remains open so that holder can continue to use portable consumer device 32.

As used herein, "terminates the relationship" or "terminating the relationship" may refer to any suitable way of ending the relationship between the employer and employee 30. For example, employee 30 may resign or retire. In another example, employer may terminate or layoff the employee 30.

Server computer 44 on issuer 34 places holder's account of portable consumer device 32 into orphan standing (step 510). The holder is not associated with an employer while holder's account is in orphan standing. Accordingly, current employer 31(*a*) does not have a financial obligation to holder while holder's account is in orphan standing. Server computer 44 on issuer 34 removes access of current employer 31(*a*) to account information 50 of holder (step 512).

Server computer 44 on issuer 34 alerts holder that the account on portable consumer device 32 is in orphan standing. Server computer 44 on issuer 34 also sends holder information concerning the terms and conditions of orphan standing (step 514). In one embodiment, an email is sent to holder with: information discussing orphan standing, a link to terms and conditions, and a letter with information regarding a direct deposit number and a routing number that apply while the account is in orphan standing.

Server computer 44 on issuer 34 transfers the account on portable consumer device 32 to a standard fee schedule (step 518). The standard fee schedule may be pre-defined by issuer 34 or other entity. In some cases, holder may pay for any charges incurred under the standard fee schedule. Server computer 44 on issuer 34 also updates account information 50 stored on database 46 (step 522). Account information 50 is updated to reflect that holder is no longer associated with current employer 31(*a*) and that the standard fee schedule applies.

Holder may initiate a relationship with new employer 31(*b*) in one embodiment. New employer 31(*b*) may notify issuer 34 that the relationship with holder has initiated. In response, server computer 44 on issuer 34 may link the holder to new employer 31(*b*) in holder's account information 50 stored in database 46 on issuer 34. New employer 31(*b*) may provide benefits information to issuer 34 describing the benefits that new employer 31(*b*) will provide to employee 30 including a new fee schedule. Server computer 44 on issuer 34 may transfer the account to the new fee schedule. In some cases, new employer 31(*b*) may pay for some or all of the charges incurred under the new fee schedule. Server computer 44 on issuer 34 may also update account information 50 stored on database 46 to reflect the new relationship with new employer 31(*b*) and the new fee schedule. Server computer 44 on issuer 34 may also provide new employer 31(*b*) with a direct deposit number and a routing number so that new employer can deposit funds into holder's account with issuer 34 to make funds available to holder on portable consumer device 32. In one case, new employer 31(*b*) may also be current employer 31(*a*). For example, current employer 31(*a*) may hire employee 30, terminate employee 30, and then re-hire employee 30. By re-hiring employee 30, current employer 31(*a*) also becomes new employer 31(*b*).

In some embodiments, holder may have multiple or zero employers at any time. In these embodiments, the relationship between the holder and any one employer may terminate or begin at any time. Holder's account with issuer 34 associated with portable consumer device 32 may remain open even though relationships with employers end. A terminating employer may notify issuer 34 that the relationship ends. In response, server computer 44 on issuer 34 may unlink the holder from the terminating employer in holder's account information 50 stored in database 46. In these embodiments, holder's account may use a standard fee schedule that is stored in database 46. Server computer 44 on issuer 34 may provide any new employers 31(*b*) with a direct deposit number and a routing number for depositing funds into holder's account to make funds available to holder with portable consumer device 32. Server computer 44 on issuer 34 may update account information 50 stored in database 46 to reflect the existing relationships.

Modifications, additions, or omissions may be made to the method without departing from the scope of the invention.

The method may include more, fewer, or other steps. Additionally, steps may be performed in any suitable order without departing from the scope of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

What is claimed is:

1. A method comprising:
    receiving a portability trigger that indicates that a first relationship between a holder of a portable consumer device and a first employer is terminated;
    in response to determining that the first relationship is terminated, disassociating, using a server computer, account information of the portable consumer device from the first employer while retaining an association between the portable consumer device and an issuer of the portable consumer device in a database coupled with the server computer, wherein the account information includes one or more device statuses;
    stripping first employer benefits information from the portable consumer device in the database, wherein the first employer benefits information comprises a first employer fee schedule for fees charged to the holder when the holder uses the portable consumer device to conduct transactions;
    determining, based on the one or more device statuses, whether the portable consumer device qualifies for placement in an orphan standing or for transfer to a second employer;
    if it is determined that the portable consumer device qualifies for said placement in said orphan standing, placing the portable consumer device in said orphan standing, alerting the holder that the portable consumer device is in said orphan standing, sending the holder information concerning terms and conditions of said orphan standing and transferring the portable consumer device to a standard fee schedule; and
    if it is determined that the portable consumer device qualifies for said transfer to the second employer, linking the account information of the portable consumer device with the second employer in the database, receiving second employer benefits information, wherein the second employer benefits information comprises a second employer fee schedule for fees charged to the holder when the holder uses the portable consumer device to conduct transactions, and transferring the portable consumer device to the second employer fee schedule.

2. The method of claim 1, wherein alerting the holder that the portable consumer device is in said orphan standing includes sending an email to the holder.

3. The method of claim 1, further comprising:
    notifying the holder that the first employer benefits information has been stripped from the portable consumer device.

4. The method of claim 1, further comprising:
    alerting the holder that the account information of the portable consumer device is disassociated from the first employer.

5. The method of claim 1, wherein linking the account information of the portable consumer device with the second employer in the database comprises providing, to the second employer, a direct deposit number and a routing number associated with an account on the portable consumer device; and the method further comprises using, by the second employer, the direct deposit number and the routing number to deposit funds to the account on the portable consumer device.

6. The method of claim 1, further comprising withdrawing first employer access to the account information on the portable consumer device of the holder.

7. The method of claim 1, wherein the account information further includes a direct deposit number and a routing number.

8. The method of claim 1, wherein the second employer is also the first employer.

9. The method of claim 1 wherein the portability trigger is a message sent from the second employer of the holder to the issuer indicating that a second relationship between the holder and the second employer has been established.

10. The method of claim 1 wherein the holder or the first employer pays for the charges incurred under the standard fee schedule or the second employer pays for some or all of the charges incurred under the second employer fee schedule.

11. The method of claim 1, wherein the one or more device statuses of the portable consumer device are designated by the first employer, the second employer, the holder, the issuer, or any combination thereof.

12. The method of claim 1 wherein it is determined that the portable consumer device does not qualify for said placement in said orphan standing or for said transfer to the second employer because the one or more device statuses includes a disqualifying status.

13. The method of claim 1, wherein the portable consumer device is a payroll card; and the first employer and the second employer are employers of the holder.

14. A computer readable medium having computer-executable code stored thereon, said computer-executable code comprising:
    computer-executable code for receiving a portability trigger that indicates that a first relationship between a holder of a portable consumer device and a first employer is terminated;
    computer-executable code for in response to determining that the first relationship is terminated, disassociating, using a server computer, account information of the portable consumer device from the first employer while retaining an association between the portable consumer device and an issuer of the portable consumer device in a database coupled with the server computer, wherein the account information includes one or more device statuses;

computer-executable code for stripping first employer benefits information from the portable consumer device in the database, wherein the first employer benefits information comprises a first employer fee schedule for fees charged to the holder when the holder uses the portable consumer device to conduct transactions;

computer-executable code for determining, based on the one or more device statuses, whether the portable consumer device qualifies for placement in an orphan standing or for transfer to a second employer;

computer-executable code for if it is determined that the portable consumer device qualifies for said placement in said orphan standing, placing the portable consumer device in said orphan standing, alerting the holder that the portable consumer device is in said orphan standing, sending the holder information concerning terms and conditions of said orphan standing and transferring the portable consumer device to a standard fee schedule; and computer-executable code for if it is determined that the portable consumer device qualifies for said transfer to the second employer, linking the account information of the portable consumer device with the second employer in the database, receiving second employer benefits information, wherein the second employer benefits information comprises a second employer fee schedule for fees charged to the holder when the holder uses the portable consumer device to conduct transactions, and transferring the portable consumer device to the second employer fee schedule.

15. A system comprising:

a database for storing account information of a portable consumer device; and a server computer coupled to the database and configured to:

receive a portability trigger that indicates that a first relationship between a holder of the portable consumer device and a first employer is terminated;

in response to determining that the first relationship is terminated, disassociate, using the server computer, the account information of the portable consumer device from the first employer while retaining an association between the portable consumer device and an issuer of the portable consumer device in the database coupled with the server computer, wherein the account information includes one or more device statuses;

strip first employer benefits information from the portable consumer device in the database, wherein the first employer benefits information comprises a first employer fee schedule for fees charged to the holder when the holder uses the portable consumer device to conduct transactions;

determine, based on the one or more device statuses, whether the portable consumer device qualifies for placement in an orphan standing or for transfer to a second employer;

place the portable consumer device in said orphan standing, alert the holder that the portable consumer device is in said orphan standing, send the holder information concerning terms and conditions of said orphan standing and transfer the portable consumer device to a standard fee schedule, if it is determined that the portable consumer device qualifies for said placement in said orphan standing; and link the account information of the portable consumer device with the second employer in the database, receive second employer benefits information, wherein the second employer benefits information comprises a second employer fee schedule for fees charged to the holder when the holder uses the portable consumer device to conduct transactions, and transfer the portable consumer device to the second employer fee schedule, if it is determined that the portable consumer device qualifies for said transfer to the second employer.

16. The system of claim 15, further comprising an access device in operative communication with the server computer.

17. The system of claim 15, wherein the server computer is further configured to: notify the holder that the first employer benefits information has been stripped from the portable consumer device.

18. The system of claim 15, wherein the server computer further configured to: alert the holder that the account information of the portable consumer device is disassociated from the first employer.

19. The system of claim 15, wherein the portable consumer device is a payroll card; and the first employer and the second employer are employers of the holder.

20. The system of claim 15, wherein to link the account information of the portable consumer device with the second employer in the database comprises providing, to the second employer, a direct deposit number and a routing number associated with an account on the portable consumer device; and wherein the server computer is further configured to use, by the second employer, the direct deposit number and the routing number to deposit funds to the account on the portable consumer device.

21. The system of claim 15, wherein the issuer is a bank; the holder has a bank account with the bank; and the account information links the bank account to transactions made on the portable consumer device.

22. The system of claim 15, wherein the server computer is further configured to use, by the second employer, the account information to deposit funds into a bank account of the holder of the portable consumer device.

23. The system of claim 15, wherein the server computer is further configured to withdraw first employer access to the account information on the portable consumer device of the holder.

24. The system of claim 15, wherein the account information further includes a direct deposit number and a routing number.

25. The system of claim 15, wherein the second employer is also the first employer.

* * * * *